Feb. 10, 1925.
A. H. DAVIS ET AL
FUMIGATION TAPE
Filed Nov. 2, 1921
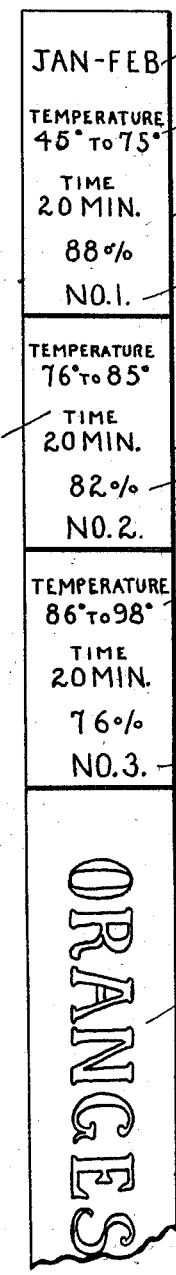
FIG. 1.
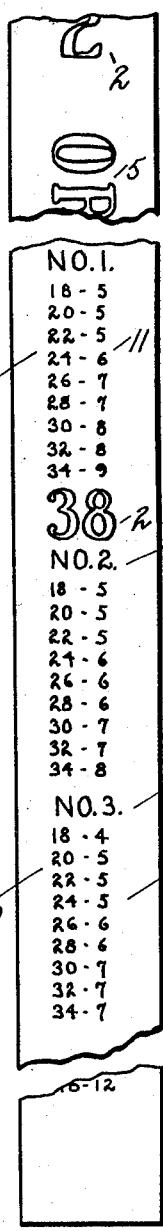
FIG. 2.
FIG. 3.
INVENTORS.
ALBERT H. DAVIS
RALPH M. JACKSON Patented Feb. 10, 1925.

1,525,769

UNITED STATES PATENT OFFICE.

ALBERT H. DAVIS AND RALPH M. JACKSON, OF LA HABRA, CALIFORNIA.

FUMIGATION TAPE.

Application filed November 2, 1921. Serial No. 512,369.

*To all whom it may concern:*

Be it known that we, ALBERT H. DAVIS and RALPH M. JACKSON, citizens of the United States, residing at La Habra, county of Orange, State of California, have invented a new and useful Fumigation Tape, of which the following is a specification.

It is the object of this invention to provide a fumigation tape, by means of which a tree to be fumigated may be measured, and the proper dosage of fumigating material for a tree of that size will show upon the tape, said dosage being corrected in accordance with the kind of tree being fumigated, as well as in accordance with climatic conditions, such as the season of the year, and the temperature.

The tape also has associated therewith, means for indicating the proper length of time for applying a dosage determined by the tape, as well as means for indicating the percent of a normal dose which is being applied, at any reading of the tape.

Tapes have been heretofore employed which gave schedules of dosage for various heights of trees at the respective linear markings along the tape, so that by reading the circumference of a tree upon the tape, and consulting the schedule at that point upon the tape, a normal dosage for a tree of the height of the one in question could be obtained.

This normal dosage, however, did not take into consideration variations which should be made in the dosage, in accordance with the kind of tree, whether lemon or orange, and in accordance with climatic conditions, such as season of the year, and temperature.

The invention, in the practical form illustrated, comprises a plurality of tapes, each having a plurality of schedules at the respective linear marks, and upon each side of the tape. The dosages denoted by these schedules are arranged for the respective heights of trees, and for the respective circumferences denoted by the linear markings of the tape, and in addition the schedules upon the respective sides of a tape at a linear mark, vary in accordance with proper dosage for lemon and orange trees respectively, and each plurality of schedules also vary in accordance with proper dosage for different temperatures. Furthermore, the schedules of the respective tapes vary to denote proper dosage for the different seasons of the year.

It will thus be seen that the improved tape will give a dosage reading for a tree of a certain circumference and height, with said dosage corrected for either orange or lemon trees, and also corrected in accordance with climatic conditions.

In the embodiment of the invention illustrated,—

Fig. 1 shows one of the tapes, partly broken away.

Fig. 2 shows another tape of a set partly broken away.

Fig. 3 is a fragmentary view showing the reverse side of the tape shown in Fig. 2.

In the present embodiment of the invention, four tapes comprise a set, and they are preferably of suitable webbing 1 and are about 75 feet long. Linear scale markings 2 are along both sides of each tape. The various tapes are for use in different seasons of the year, and a key which is upon both sides of a tape at its end, has a marking 3 denoting the months when the tape is used.

The key includes sub-divisions 4 for the respective schedules employed with different temperatures. We usually employ three temperature changes, utilizing three schedules, but as shown in Fig. 3, with this arrangement, the tape for the months July to Oct., preferably is arranged for four temperature changes and four schedules, upon its lemon tree side.

The key and schedules upon one side of each tape is for orange trees, as shown in Figs. 1 and 2, while the key and schedules upon the opposite side of a tape, is for lemon trees, as shown in Fig. 3. As a convenient indicating means, markings 5 comprising the word "Oranges" or "Lemons" are arranged at suitable points along the respective sides of a tape.

The temperature ranges for the respective schedules are marked in the respective sub-division of a key, as shown at 6; and each sub-division also has a marking 7, denoting the maximum length of time for applying a dose, as well as a marking 8 denoting the percentage of a normal dose which is applied, when that particular schedule is used. The various sub-divisions of a key also carry an identifying mark 9, so that when the proper schedule has been determined from the key, it may be readily identified along the tape, by a similar identifying mark 9ª.

A schedule for each sub-division of a key is arranged at the respective scale markings 2 along the tape. These schedules each comprise their identifying mark 9ª, a table of linear measurement 10 denoting heights of trees, and a cooperating table indicating dosage, preferably in ounces, by marks 11 alongside the indicating marks of table 10.

The dosage denoted by marks 11 is computed to take into consideration first of all, the circumference and height of a tree, as in the tape now in use, and also to take into consideration the additional factors of kind of tree, whether lemon or orange, season of the year, and temperature.

Thus for example, it will be seen by referring to the drawings, that in Jan.–Feb., at a temperature of 45–75 degrees, an orange tree will take an 88% dosage, as shown by sub-division 1 of the key. If now a tree is 38 ft. in circumference as measured by the tape, and is 34 ft. high, schedule 1 at the 38 foot mark will show a dosage of 9 ounces.

In July–Oct. however, at the same temperature, an orange tree will take only a 76% dosage; so that the same tree would have a dosage of 7 ounces as shown by the schedule. A lemon tree, on the other hand, at the same time of year, namely July–Oct., and at the same temperature, will take an 88% dosage.

It will thus be seen that the improved tape will denote a relatively higher dosage for lemon than for orange trees, since the former are able to take such an increased dosage, and furthermore that a relatively higher dosage is shown for winter than for summer, since the trees may with safety be subjected to such an increased dosage in the winter season.

As a further example of the working of the device, it will be seen that in Jan.–Feb., orange trees take an 88% dosage at a temperature of 45 to 75 degrees, but at a temperature of 76 to 85 degrees, they take only an 82% dosage as shown by schedule 2, and at 86 to 98 degrees they take only 76% as shown by schedule 3.

In other words, the dosage is adjusted for a higher dosage in cold weather, when the trees will stand the same, than in warmer weather when such a high dosage cannot be safely applied.

The improved tape thus provides linear markings for measuring the circumference of a tree, and at said markings has schedules denoting dosage for trees of various height, said dosage being adjusted for variations in the season of the year and for temperature changes, and also being corrected for either orange or lemon trees.

While we have illustrated and described but one practical embodiment of the invention, it will be apparent that various changes may be made in the details of construction and arrangement without departing from the spirit of the invention.

What is claimed is:

1. A tape having a graduated scale for measuring one dimension of an objective, tables at the respective graduations of said scale denoting ranges of measurement of another dimension of the objective, and a plurality of dosage tables at the respective graduations of the scale and adjacent said tables of measurement, said dosage tables bearing a predetermined relation to the dimensions of said objective as denoted by both the graduated scale and by said tables of measurement, and also bearing a predetermined fractional relationship one to another.

2. A tape having a graduated scale for measuring one dimension of an objective, tables at the respective graduations of said scale denoting ranges of measurement of another dimension of the objective, and a plurality of dosage tables at the respective graduations of the scale and adjacent said tables of measurement, said dosage tables bearing a predetermined relation to the dimensions of said objective as denoted by both the graduated scale and by said tables of measurement, and also bearing a predetermined fractional relationship one to another, and means on said tape for identifying the dosage table for use under different existing conditions.

3. A tape having a graduated scale for measuring one dimension of an objective, tables at the respective graduations of said scale denoting ranges of measurement of another dimension of the objective, a plurality of dosage tables at the respective graduations of the scale and adjacent said tables of measurement, said dosage tables bearing a predetermined relation to the dimensions of said objective as denoted by both the graduated scale and by said tables of measurement and also bearing a predetermined fractional relationship one to another, and means on said tape for identifying the dosage table for use under different climatic conditions, with objectives of different condition, and with different kinds of objectives.

In testimony whereof we have signed our names to this specification.

ALBERT H. DAVIS.
RALPH M. JACKSON.